(12) United States Patent
Sato

(10) Patent No.: US 7,595,827 B2
(45) Date of Patent: Sep. 29, 2009

(54) IMAGING DEVICE

(75) Inventor: Koichi Sato, Saitama (JP)

(73) Assignee: Hoya Corporation, Tokyo (JP)

( * ) Notice: Subject to any disclaimer, the term of this patent is extended or adjusted under 35 U.S.C. 154(b) by 270 days.

(21) Appl. No.: 11/779,356

(22) Filed: Jul. 18, 2007

(65) Prior Publication Data
US 2008/0018763 A1   Jan. 24, 2008

(30) Foreign Application Priority Data
Jul. 20, 2006   (JP)   ............. 2006-198653

(51) Int. Cl.
*H04N 3/14* (2006.01)
*H04N 5/335* (2006.01)
(52) U.S. Cl. ............ 348/296; 348/294; 348/302; 348/308
(58) Field of Classification Search ............ 348/296
See application file for complete search history.

(56) References Cited

U.S. PATENT DOCUMENTS

| 7,324,144 | B1 * | 1/2008 | Koizumi | ............ 348/294 |
| 7,542,085 | B2 * | 6/2009 | Altice et al. | ............ 348/296 |
| 2004/0169209 | A1 * | 9/2004 | Berezin et al. | ............ 257/292 |
| 2006/0001755 | A1 | 1/2006 | Sato et al. | |
| 2006/0098970 | A1 | 5/2006 | Sato | |
| 2006/0164531 | A1 * | 7/2006 | Yaung et al. | ............ 348/308 |
| 2006/0226342 | A1 | 10/2006 | Sato et al. | |
| 2007/0013798 | A1 * | 1/2007 | Ahn et al. | ............ 348/308 |
| 2007/0097225 | A1 | 5/2007 | Sato et al. | |
| 2008/0106625 | A1 * | 5/2008 | Border et al. | ............ 348/296 |

FOREIGN PATENT DOCUMENTS

JP   200264751   2/2002

OTHER PUBLICATIONS

English language Abstract of JP 2002-64751.

* cited by examiner

*Primary Examiner*—Tuan V Ho
*Assistant Examiner*—Jason Flohre
(74) *Attorney, Agent, or Firm*—Greenblum & Bernstein, P.L.C.

(57) ABSTRACT

An imaging device comprises a photoelectric conversion element; first, second, and third capacitors; first, second, third, and fourth charge transfer elements; a reset element; and an amplifier element. The photoelectric conversion element generates an electrical charge according to the amount of received light. The first and second capacitors receive and store the electrical charge. The electrostatic capacity of the second capacitor is lower than that of the first capacitor. The first and second charge transfer elements transfer the electrical charge to the first and second capacitors simultaneously. The third capacitor receives the electrical charge stored in the first or second capacitor. The electrical potential of the third capacitor varies according to the received electrical charge. The third and fourth charge transfer elements transfer the electrical charge stored in the first and second capacitors to the third capacitor separately.

3 Claims, 8 Drawing Sheets

IMAGING DEVICE

BACKGROUND OF THE INVENTION

1. Field of the Invention

The present invention relates to an XY address type imaging device, which has a global shutter function.

2. Description of the Related Art

Recently, XY address type imaging devices, such as a CMOS imaging device, have been a focus of attention. A CMOS imaging device can be driven by lower power and manufactured at a lower cost than a charge transfer type imaging device, such as a CCD imaging device.

However, the regular CMOS imaging device from the prior art does not have a global shutter function that commands all pixels to receive incident light at the same time, whereas a CCD imaging device does. Regarding this problem, Japanese Patent Publication No. 2002-64751 discloses a CMOS imaging device having a global shutter function.

It is not only possible to carry out the global shutter function, but also to increase the dynamic range. An increase in the dynamic range is carried out by capturing an optical image twice and adding signals generated by short time capturing and by long time capturing.

However, there is a time lag between the two captures of the optical image. Consequently, picture quality is deteriorated when the optical image of a fast-moving object is attempted to be captured.

SUMMARY OF THE INVENTION

Therefore, an object of the present invention is to provide an XY address type imaging device which has a global shutter function and which has a wide dynamic range, without deteriorating the picture quality.

According to the present invention, an imaging device comprises a photoelectric conversion element; first, second, and third capacitors; first, second, third, and fourth charge transfer elements; a reset element; and an amplifier element. The photoelectric conversion element generates an electrical charge according to the amount of light received by the photoelectric conversion element. The first capacitor receives and stores the electrical charge generated by the photoelectric conversion element. The second capacitor receives and stores the electrical charge generated by the photoelectric conversion element. An electrostatic capacity of the second capacitor is lower than that of the first capacitor. The first and second charge transfer elements transfer the electrical charge generated by the photoelectric conversion element to the first and second capacitors simultaneously, respectively. The third capacitor receives the electrical charge stored in the first or second capacitor. An electrical potential of the third capacitor varies according to the received electrical charge. The third charge transfer element transfers the electrical charge stored in the first capacitor to the third capacitor. The fourth charge transfer element transfers the electrical charge stored in the second capacitor to the third capacitor at a different time from that of the third charge transfer element. The reset element resets the electrical charge stored in the third capacitor. The amplifier element outputs a pixel signal according to the electrical potential of the third capacitor.

Further, a plurality of pixels are arranged in two dimensions on the light receiving surface of the imaging device. The pixel has the first, second, and third capacitors, the first, second, third, and fourth charge transfer elements, the reset element, and the amplifier element.

Further, the first and second capacitors are MOS capacitors.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
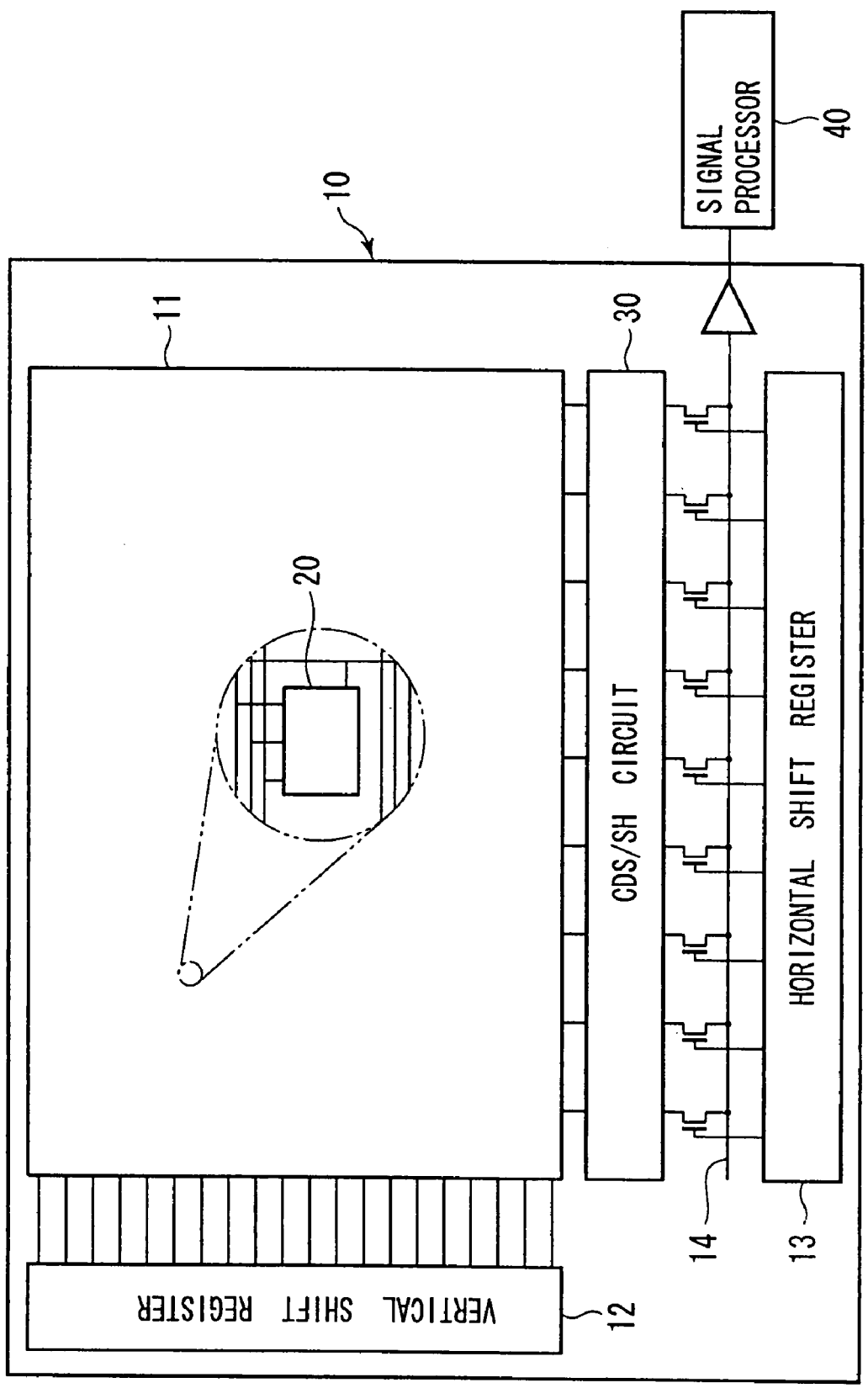
FIG. 1 schematically illustrates the structure of a CMOS solid state imaging device as a first embodiment of the present invention.
Figure 2:
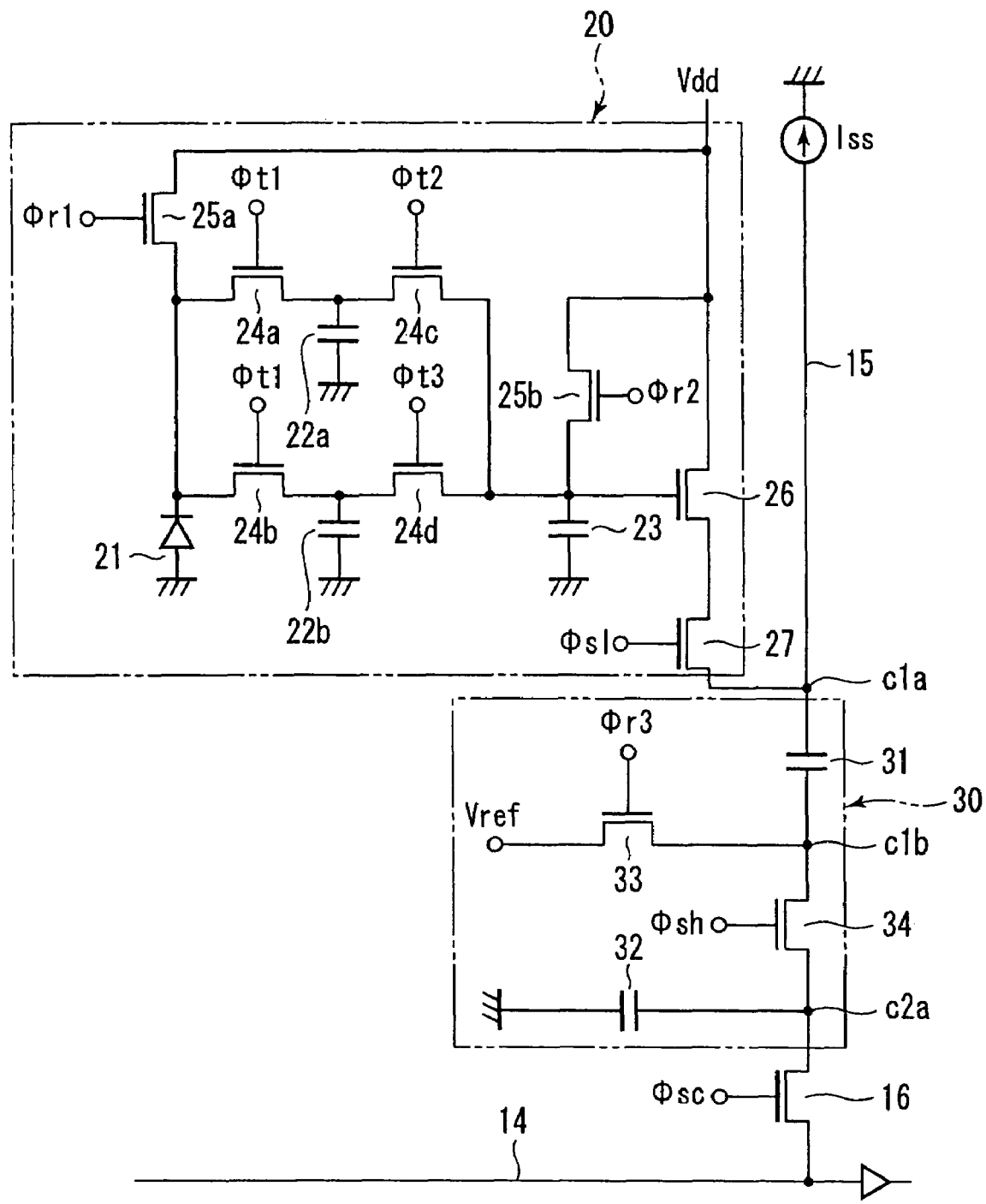
FIG. 2 illustrates the circuit structure of the imaging device, focusing on the circuit structure of one pixel and the CDS/SH circuit in the first embodiment.

The present invention is described below with reference to the embodiments shown in the drawings.

A CMOS solid state imaging device 10 comprises an imaging block 11, a vertical shift register 12, a correlated double sampling/sample and hold (CDS/SH) circuit 30, a horizontal shift register 13, and a horizontal output line 14. The vertical shift register 12 is directly connected to the imaging block 11. The horizontal output line 14 is connected to the imaging block 11 through the CDS/SH circuit 30.

Plural pixels 20 are arranged on the light receiving surface of the imaging block 11 in a matrix. A signal charge is generated in each pixel 20. The set of pixel signals that is generated in all the pixels 20 on the light receiving surface comprises image signals corresponding to the image of the photographed object. A pixel signal is output from each pixel 20 one by one, and the vertical and horizontal shift registers 12, 13 are used to select the pixel 20 that outputs a pixel signal.

The vertical shift register 12 selects a horizontal line that is the row of the pixel 20 that will output a pixel signal. The CDS/SH circuit 30 performs a correlated double sampling of a pixel signal from the pixels 20 in the row selected by the vertical shift register 12.

The horizontal shift registers 13 selects the pixel signal sampled and held by the CDS/SH circuit 12, and then the selected pixel signal is transferred to the horizontal output line 14. Next, the pixel signal is output to the computer (not depicted) for signal processing through the horizontal output line 14. The computer carries out image processing on the pixel signal, and the pixel signal is transformed into the image signal.

The circuit structure of one pixel 21 and the CDS/SH circuit 30 are explained in detail below. A pixel 20 comprises a photodiode (PD) 21; first and second capacitors 22a, 22b; a floating diffusion (FD) 23; first, second, third, and fourth transfer transistors 24a, 24b, 24c, 24d; first and second reset transistors 25a, 25b; an amplifier transistor 26; and a row select transistor 27.

An electrical charge is generated by PD 21 according to the amount of light received by the pixel 20. PD 21 stores the generated electric charge, and is connected to the first and second capacitors 22a, 22b via the first and second transfer transistor 24a, 24b, respectively. Further, PD 21 is connected to a voltage source, hereinafter referred to as Vdd, via the first reset transistor 25a.

The gates of the first and second transistors 24a, 24b are connected to a first transfer-signal-line. A first transfer signal, hereinafter referred to as φt1, having alternate ON and OFF pulse patterns flows through the first transfer-signal-line. When φt1 under the ON state flows through the first transfer-signal-line, the first and second transfer transistors 24a, 24b transfer signal charge from PD 21 to the first and second capacitors 22a, 22b, respectively. Additionally, the gates of the first and second transfer transistors 24a, 24b in all pixels 20 are connected to a singular first transfer-signal-line.

The electrostatic capacity of the first capacitor 22a, hereinafter referred to as C1, is nine times as large as the electrostatic capacity of the second capacitor 22b, hereinafter referred to as C2. Consequently, when the signal charge stored in PD 21, hereinafter referred to as Qpd, is transferred, an electrical charge of Qpd×C1/(C1+C2), which is Qpd×9/10, is stored in the first capacitor 22a, and an electrical charge of Qpd×C2/(C1+C2), which is Qpd/10, is stored in the second capacitor 22b. Incidentally, the electrostatic capacities of the first and second capacitors 22a, 22b are adjusted by adjusting their areas.

A gate of the first reset transistor 25a is connected to a first reset-signal-line. A first reset signal, hereinafter referred to as φr1, having alternate ON and OFF pulse patterns, flows through the first reset-signal-line. When φr1, in the ON state, flows through the first reset-signal-line, the signal charge stored in PD 21 is reset. Incidentally, the gates of the first reset transistors 25a in all pixels 20 are connected to a singular first reset-signal-line.

FD 23 is connected to the first and second capacitors 22a, 22b via the third and fourth transfer transistors 24c, 24d, respectively. The gates of the third and fourth transfer transistors 24c, 24d are connected to the second and third transfer-signal-lines, respectively. The second and third transfer signals, hereinafter referred to as φt2, φt3, having alternate ON and OFF pulse patterns, flow through the second and third transfer-signal-lines, respectively.

A plurality of the second and third transfer-signal-lines are mounted for every row along which the pixels 20 are arranged. The ON and OFF states of φt2 and φt3 alternate at different times according to the rows of the second and third transfer-signal-lines. The third and fourth transfer transistors 24c, 24d of all pixels 20 arranged in the same row are connected to the same third and fourth transfer-signal-lines, respectively.

When φt2, in the ON state, flows through the second transfer-signal-line, the third transfer transistor 24c transfers the signal charge stored in the first capacitor 22a to FD 23. When φt3, in the ON state, flows through the third transfer-signal-line, the fourth transfer transistor 24d transfers the signal charge stored in the second capacitor 22b to FD 23, which receives the signal charge and generates a voltage in accordance with the received signal charge.

FD 23 is connected to Vdd via the second reset transistor 25b. A gate of the second reset transistor 25b is connected to a second reset-signal-line. A second reset signal, hereinafter referred to as φr2, having alternate ON and OFF pulse patterns, flows through the second reset-signal-lines.

A plurality of second reset-signal-lines are mounted for every row along which the pixels 20 are arranged. The ON and OFF states of φr2 alternate at different times according to the rows of the second reset-signal-line. Second reset transistors 25b of all pixels 20 arranged in the same row are connected to the same second reset-signal-line.

When φr2 under the ON state flows through the second reset-signal-line, the signal charge stored in FD 23 is reset by being drained to Vdd through the second reset transistor 25b. Then the electrical potential of FD 23 is reset to (Vdd−Vthrs). Vdd is the electrical potential of the voltage source Vdd, and Vthrs is the threshold electrical potential of the second reset transistor 25b.

FD 23 is also connected to a gate of the amplifier transistor 26, and a drain of the amplifier transistor 26 is connected to Vdd. Further, a source of the amplifier transistor 26 is connected to the vertical output line via the row select transistor 27. The amplifier transistor 26 adjusts output impedance and outputs a potential signal, in accordance with the electrical potential of FD 23, as a pixel signal.

A gate of the row select transistor 27 is connected to a select-signal-line. A select signal, hereinafter referred to as φsl, having alternate ON and OFF pulse patterns, flows through the select-signal-line. When φsl, in the ON state, flows through the select-signal-line, the pixel signal can be output to the vertical output line 15.

A plurality of select-signal-lines are mounted for every row along which the pixels 20 are arranged. The ON and OFF states of φsl alternate at different times according to the rows of the select-signal-line. Row select transistors 27 of all pixels 20 arranged in the same row are connected to the same select-signal-line.

Incidentally, the first, second, and third transfer-signal-lines, the first and second reset-signal-lines, and the select-signal-lines run horizontally in the imaging block 11, and are connected to the vertical shift register 12. The vertical shift register 12 outputs φt1, φt2, φt3, φr1, φr2, and φsl to the signal-lines.

Vertical output lines 15 run vertically between successive pixels 20, arranged vertically in the imaging block 11. Row select transistors 27 in all pixels 20 arranged in the same column are connected to the same vertical output lines 15. The top end of each vertical output line 15 is connected to the current source, hereinafter referred to as Iss. The bottom end of each vertical output line 15 is connected to the CDS/SH circuit 30.

The CDS/SH circuit 30 comprises a clamp capacitor 31, a sample and hold capacitor 32, a third reset transistor 33, and a sample and hold transistor 34.

An input terminal c1a of the clamp capacitor 31, of which the electrostatic capacity is Ccl, is connected to the vertical output line 15, and an output terminal c1b of the clamp capacitor 31 is connected to a reference voltage source, hereinafter referred to as Vref.

The output terminal c1b of the clamp capacitor 31 is connected to a first terminal c2a of the sample and hold capacitor 32, of which the electrostatic capacity is Csh, via the sample and hold transistor 34. The other terminal of the sample and hold capacitor 32 is grounded.

Gates of the third reset transistor 33 and the sample and hold transistor 34 are connected to a third reset-signal-line and a sample/hold-signal-line, respectively. A third reset signal, hereinafter referred to as φr3, and a sample/hold signal, hereinafter referred to as φsh, having alternate ON and OFF pulse patterns, flow through the third reset-signal-line and the sample/hold-signal-line, respectively.

A plurality of CDS/SH circuits 30 are mounted for every vertical output line 15. The third reset transistors 33 and sample and hold transistors 34 of all CDS/SH circuits 30 are connected to the third reset-signal-line and the sample/hold-signal-line, respectively.

As described later, by changing the ON and OFF states of φr3 and φsh at a predetermined time, correlated double sampling/sample and hold signal processing is carried out for a pixel signal output from the pixel 20 by the CDS/SH circuit 30.

The first terminal c2a of the sample and hold capacitor 32 is connected to the horizontal output line 14 via a column select transistor 16. A gate of the column select transistor 16 is connected to the column select-signal-line. A column select signal, hereinafter referred to as φsc, having alternate ON and OFF pulse patterns, flows through the column select-signal-line. When φsc, in the ON state, flows through the column select-signal-line, the pixel signal sampled and held by the CDS/SH circuit 30 is output to the horizontal output line 14.

Figure 3:
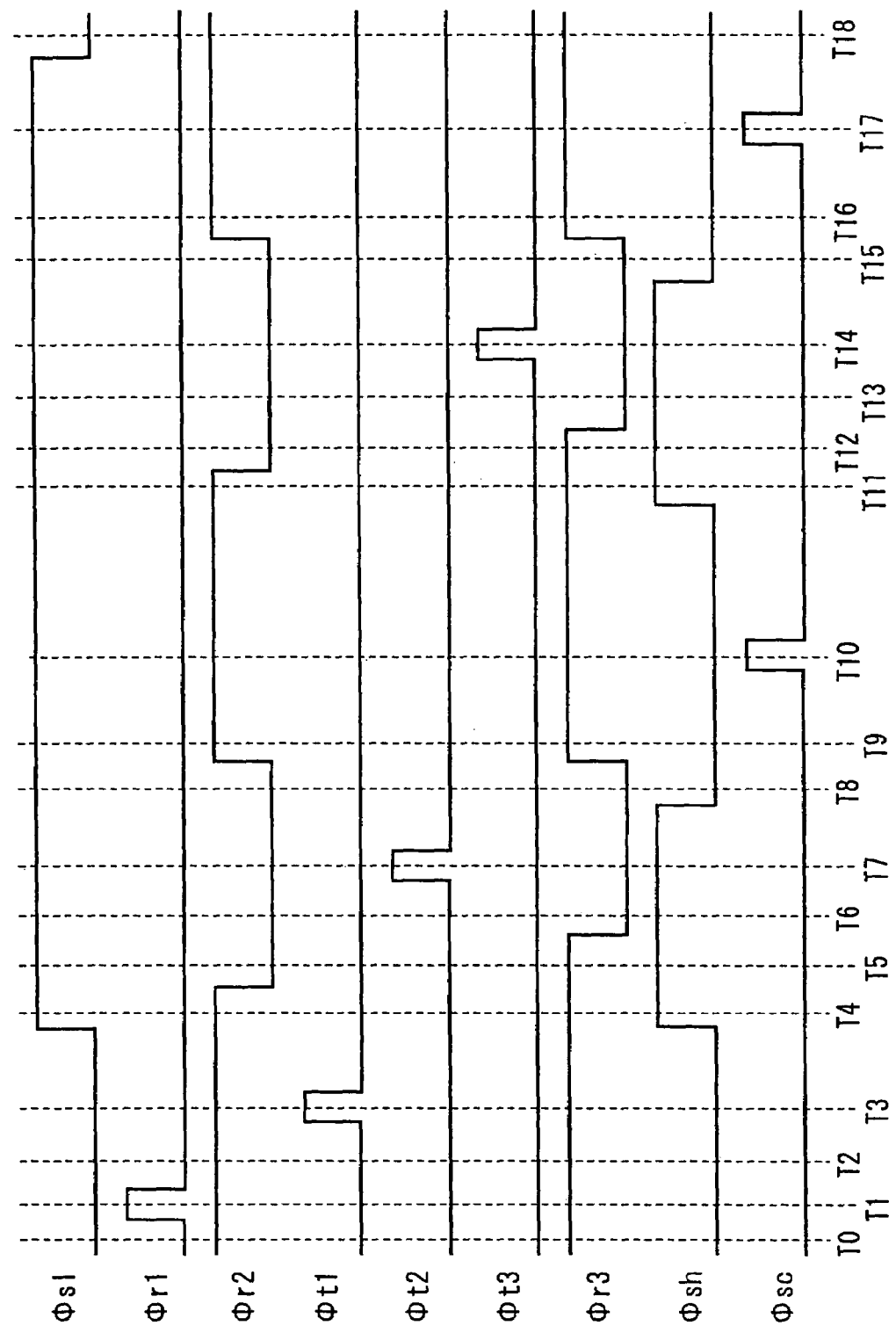
FIG. 3 is a timing chart of the data output process of the imaging device in the first embodiment.

The operation of the CMOS solid state imaging device 10 in the first embodiment is described below with reference to FIG. 3, which is a timing-chart of the data output process in the first embodiment.

At the time T0, when standing by for the photographing operation, φr2 and φr3 are kept in the ON state. FD 23 and the clamp capacitor 31 are reset by keeping φr2 and φr3 in the ON state. Then, the electrical potential of FD 23 and the output terminal c1b of the clamp capacitor 31 are kept as (Vdd−Vthrs) and Vref, respectively.

When a user inputs a command to take a photograph, the photographing operation of the CMOS solid state imaging device 10 commences.

At the time T1, φr1 is switched to the ON state, and a signal charge stored in PD 21 is drained to Vdd.

At the time T2, φr1 is switched to the OFF state, and PD 21 generates and stores a signal charge.

At the time T3, φt1 is switched to the ON state, and the signal charges stored in PD 21 of all pixels 20 are transferred to the first and second capacitors 22a, 22b.

Additionally, the exposure time of the CMOS solid state imaging device 10 is the period from when the state of φr1 is switched to the OFF state to when the state of φt1 is switched to the ON state. The exposure time is adjustable by adjusting the time period.

After the time T3, the pixels 20 in the row which is to output the pixel signals are selected one by one from the top to the bottom. Consequently, the ON and OFF states of φt2, φt3, and φsl are changed separately for each row.

The output of a pixel signal from a pixel 20 arranged in a row is explained below. The same operation is carried out for the other rows.

At the time T4, φsl is switched to the ON state, and a pixel signal can be output from the pixel 20. At the same time, φsh is switched to the ON state, and the sample and hold capacitor 32 is reset and the electrical potential of the first terminal c2a of the sample and hold capacitor 32 is reset to Vref.

At the time T5, φr2 is switched to the OFF state while keeping φr3 in the ON state, and the reset of FD 23 finishes and the electrical potential of FD 23 changes to (Vdd−Vthrs+Vktc) due to ktc noise.

In addition, a potential signal, of which the electrical potential is the threshold electrical potential of the amplifier transistor 26, hereinafter referred to as Vtham, subtracted from the electrical potential of FD 23 (Vdd−Vthrs+Vktc−Vtham), is output to the vertical output line 15 and the input terminal c1a. Then the potential difference of the clamp capacitor 31 becomes (Vdd−Vthrs+Vktc−Vtham−Vref) because φsh is kept in the ON state.

At the time T6, φr3 is switched to the OFF state, and the output terminal c1b of the clamp capacitor 31, and the first terminal c2a of the sample and hold capacitor 32, are made to float electrically.

At the time T7, φt2 is switched to the ON state, and the signal charge stored in the first capacitor 22a is transferred to FD 23. The electrical potential of FD 23 varies with delta V1, hereinafter referred to as ΔV1, according to the signal charge transferred from the first capacitor 22a. Consequently, the electrical potential of FD 23 becomes (Vdd−Vthrs+Vktc+ΔV1).

According to the varied electrical potential of FD 23, the electrical potential of the input terminal c1a of the clamp capacitor 31 becomes (Vdd−Vthrs+Vktc−Vtham+ΔV1). Consequently, the varied quantity of the electrical potential at the input terminal c1a of the clamp capacitor 31 is calculated as $$(Vdd-Vthrs+Vktc-Vtham+\Delta V1)-(Vdd-Vthrs+Vktc-Vtham)=\Delta V1.$$

According to the varied electrical potential of the input terminal c1a, the electrical potentials of the output terminal c1b and the first terminal c2a of the sample and hold capacitor 32, which float electrically, vary with Vref+(ΔV1×Csh/(Ccl+Csh)).

At the time T8, φsh is switched to the OFF state, and the sample and hold capacitor 32 samples and holds the varied quantity of the electrical potential, which is Vref+(ΔV1×Csh/(Ccl+Csh)), at the first terminal c2a.

Incidentally, sample and hold capacitors 32 of all pixels 20, arranged in the same row, sample and hold a varied quantity of electrical potential, which is the pixel signal.

At the time T9, φr2 and φr3 are switched to the ON state. Then, FD 23 and the clamp capacitor 31 are reset and the electrical potentials of FD 23 and the output terminal c1b of the clamp capacitor 31 are reset to (Vdd−Vthrs) and Vref, respectively, similar to at the time T4.

After the time T9, φsc for a plurality of the column select transistors 16 is switched to the ON state one by one from left to right (see the time T10). Then, the pixel signal which is sampled and held by the sample and hold capacitor 32 is output from the CMOS solid state imaging device 10 via the horizontal output line 14.

At the time T11, after a pixel signal is output from the pixel arranged at the right end, φsh is switched to the ON state. Then the sample and hold capacitor 32 is reset, and the electrical potential of the first terminal of the sample and hold capacitor 32 is reset to Vref.

At the time T12, φr2 is switched to the OFF state while keeping φr3 in the ON state, and the reset of FD 23 finishes and the potential difference of the clamp capacitor 31 becomes (Vdd−Vthrs+Vktc−Vtham−Vref), similar to at the time T5.

At the time T13, φr3 is switched to the OFF state, and the output terminal c1b of the clamp capacitor 31, and the first terminal c2a of the sample and hold capacitor 32, are made to float electrically.

At the time T14, φt3 is switched to the ON state, and the signal charge stored in the second capacitor 22b is transferred to FD23. The electrical potential of FD 23 varies with delta V2, hereinafter referred to as ΔV2, according to the signal charge transferred from the second capacitor 22b. Consequently, the electrical potential of FD 23 becomes (Vdd−Vthrs+Vktc+ΔV2).

Similar to at the time T7, the electrical potentials of the output terminal c1b of the clamp capacitor 31 and the first terminal c2a of the sample and hold capacitor 32 vary with Vref+(ΔV2×Csh/(Ccl+Csh)).

At the time T15, φsh is switched to the OFF state, and the sample and hold capacitor 32 samples and holds the varied quantity of the electrical potential, which is Vref+(ΔV2×Csh/(Ccl+Csh)), at the first terminal c2a.

At the time T16, φr2 and φr3 are switched to the ON state, again. Then, FD 23 and the clamp capacitor 31 are reset and the electrical potentials of FD 23 and the output terminal c1b of the clamp capacitor 31 are reset to (Vdd−Vthrs) and Vref, respectively, similar to at the time T4.

After the time T16, φsc for a plurality of the column select transistors 16 is switched to the ON state, one by one from left to right (see the time T17). Then, the pixel signal which is sampled and held by the sample and hold capacitor 32 is output from the CMOS solid state imaging device 10 via the horizontal output line 14.

At the time T18, after the pixel signal is output from the pixel 20 arranged at the right end, φsl is switched to the OFF state. Then, the output of pixel signals from the pixels 20 arranged in the specified row, finishes. After this, pixel signals which are generated by other pixels 20 arranged in the other rows are output similar to the operations held at the times T3~T18.

Figure 4:
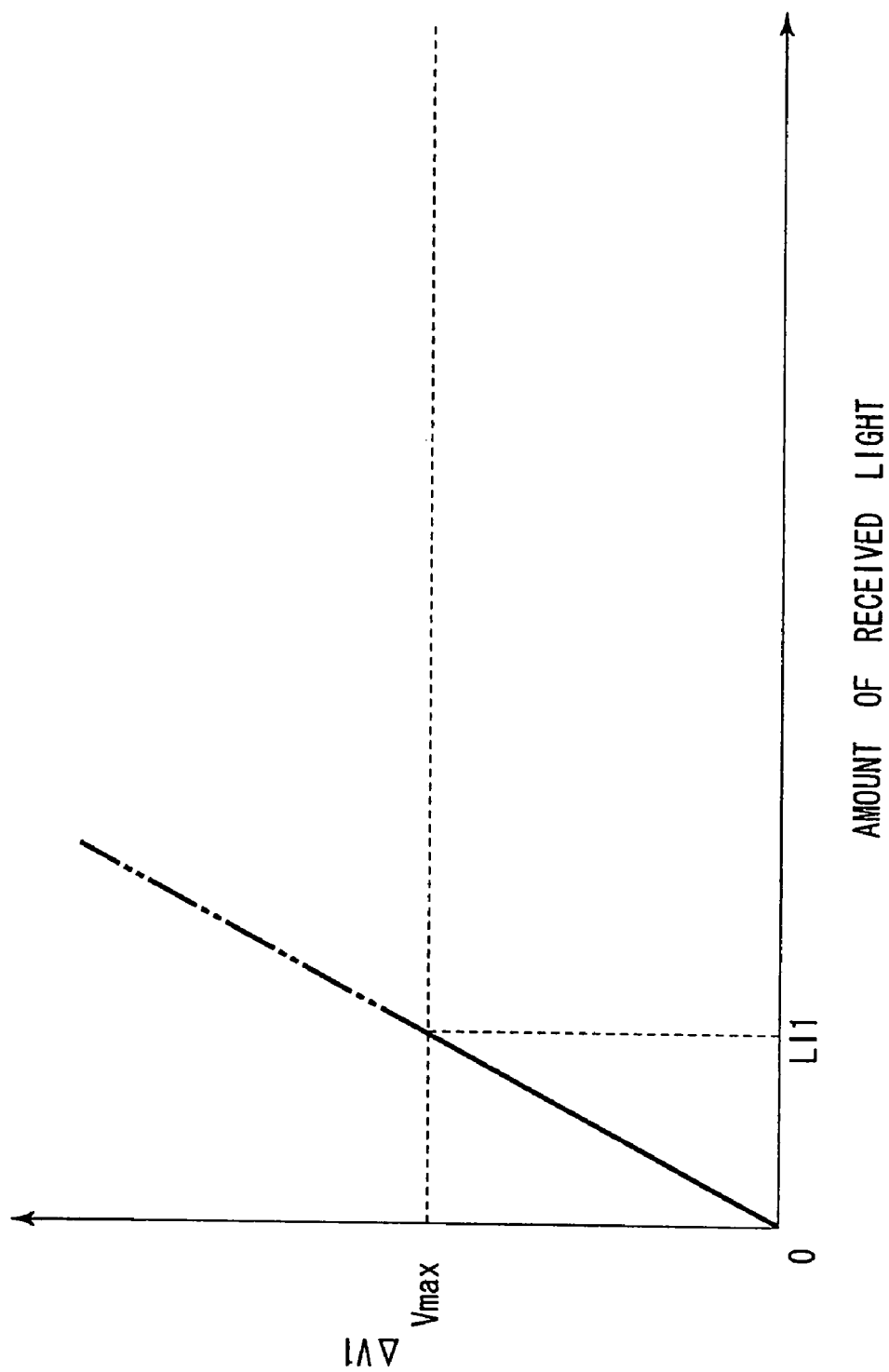
FIG. 4 is a graph showing the relationship between the amount of received light and the signal level of a pixel signal based on a signal charge stored in the first capacitor.
Figure 5:
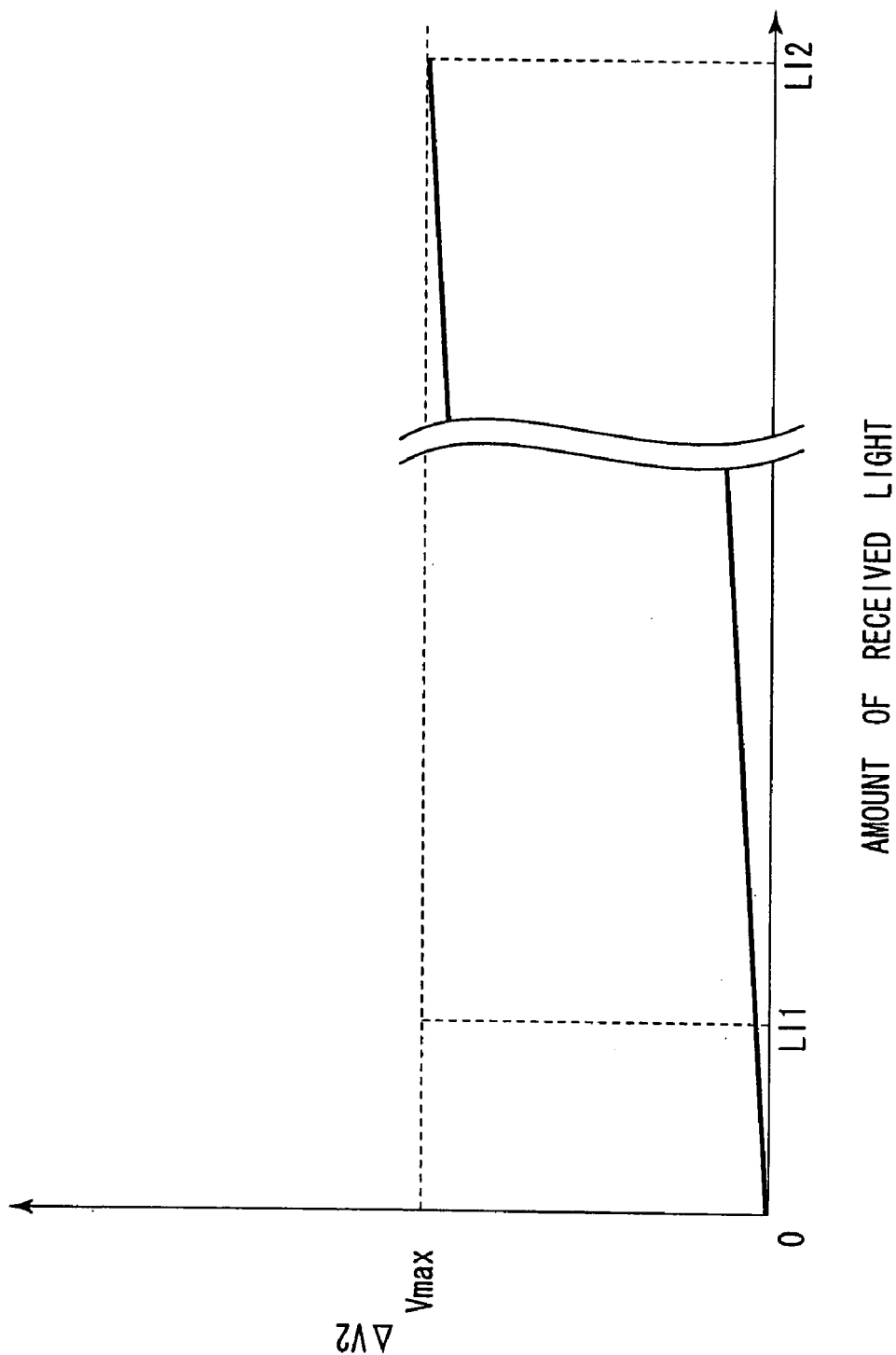
FIG. 5 is a graph showing the relationship between the amount of received light and the signal level of a pixel signal based on a signal charge stored in the second capacitor.

The relationship between the amount of received light and the signal level of a pixel signal of the CMOS solid state imaging device 10 driven as described above is explained by FIGS. 4~6.

The upper limit of a potential signal output from the row select transistor 27 depends on the electrical potential of Vdd. Consequently, the maximum value of the signal level of the pixel signal, hereinafter referred to as Vmax, is fixed based on Vdd. Further, the maximum value of the signal charge that FD 23 converts into the pixel signal, and corresponds to the Vmax, hereinafter referred to as Qmax, is fixed.

As described above, 90% of the signal charge stored in PD 21 is transferred to the first capacitor 22a. If the amount of received light is less than a first amount, hereinafter referred to as LI1, the signal charge stored in the first capacitor is less than Qmax. Consequently, the signal level of the pixel signal based on the signal charge stored in the first capacitor 22a increases according to the amount of light received by PD 21 (see FIG. 4).

If the amount of received light is more than LI1, the signal charge greater than Qmax is stored in the first capacitor 22a. Then, the signal level of the pixel signal based on the signal charge stored in the first capacitor 22a settles to Vmax.

On the other hand, as described above, 10% of the signal charge stored in PD 21 is transferred to the second capacitor 22b. When the amount of received light is equal to a second amount, hereinafter referred to as LI2, which is greater than LI1, the signal charge stored in the second capacitor 22b becomes Qmax. Consequently, a pixel signal that varies according to the amount of received light can be generated as long as the amount is equal to or less than LI2 (see FIG. 5).

Figure 6:
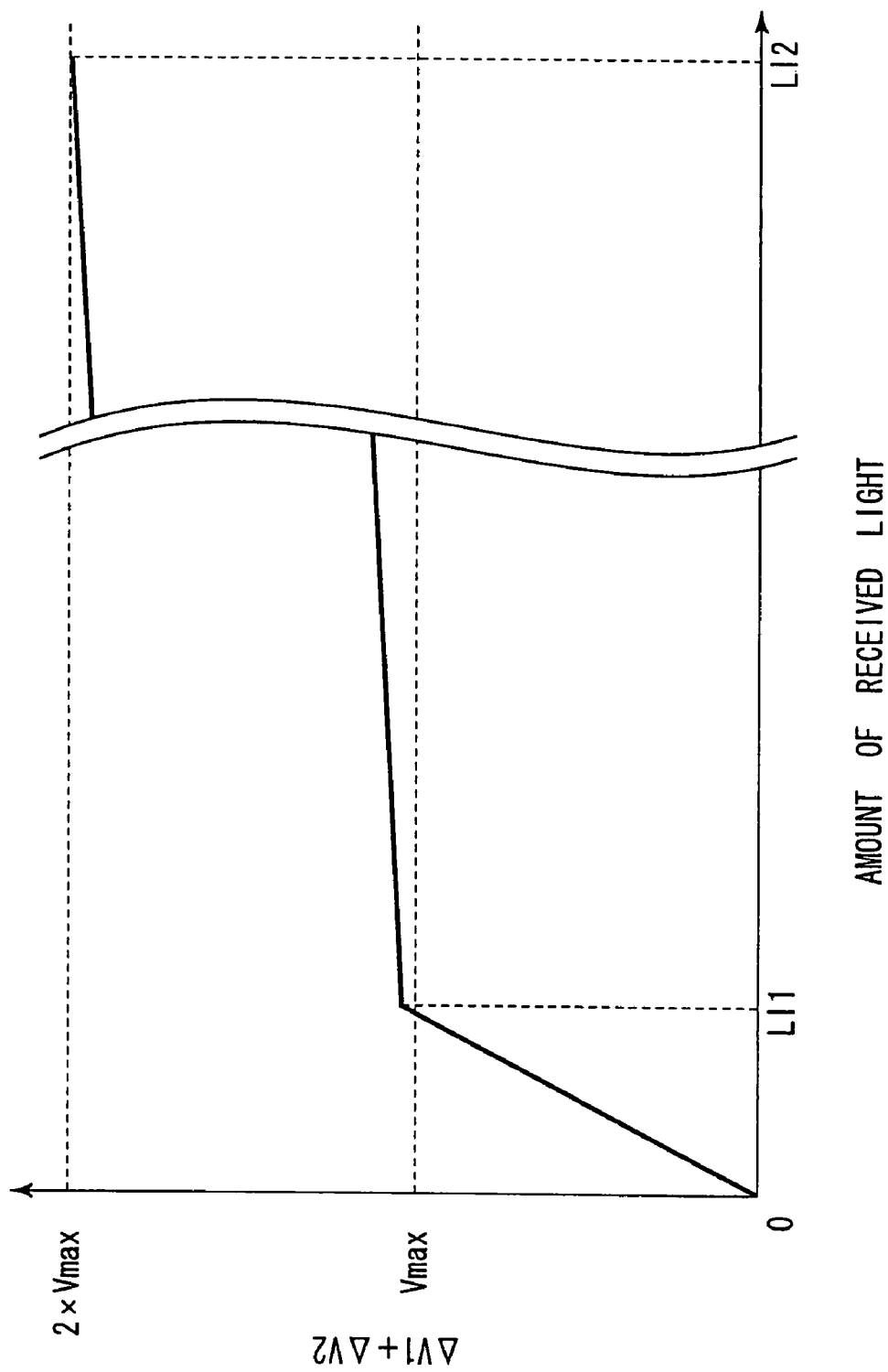
FIG. 6 is a graph showing the relationship between the amount of received light and the sum of the signal levels of pixel signals based on a signal charge stored in the first and the second capacitors.

A signal processor 40 (see FIG. 1), which is connected to the CMOS solid state imaging device 10, sums up ΔV1 and ΔV2 that are signal levels of pixel signals generated based on the first and second capacitors, in the same pixel 20, respectively. As shown in FIG. 6, when the amount of received light at a pixel 20 ranges between zero and an amount equal to LI1, the pixel signal is highly sensitive to the amount of received light. On the other hand, when the amount of received light ranges between LI1 and LI2, the pixel signal is less sensitive to the amount of received light, but has a wider range of receivable light.

According to the above first embodiment, a CMOS solid state imaging device 10 can have a wide dynamic range without deteriorating the picture quality by carrying out the global shutter function.

Next, the second embodiment is explained below. The second embodiment is different from the first embodiment, mainly regarding the use of a MOS capacitor instead of the first and second capacitors. The second embodiment is explained mainly regarding the structures of the second embodiment that are different from those of the first embodiment. The same symbols are used for structures that are the same as those in the first embodiment.

Figure 7:
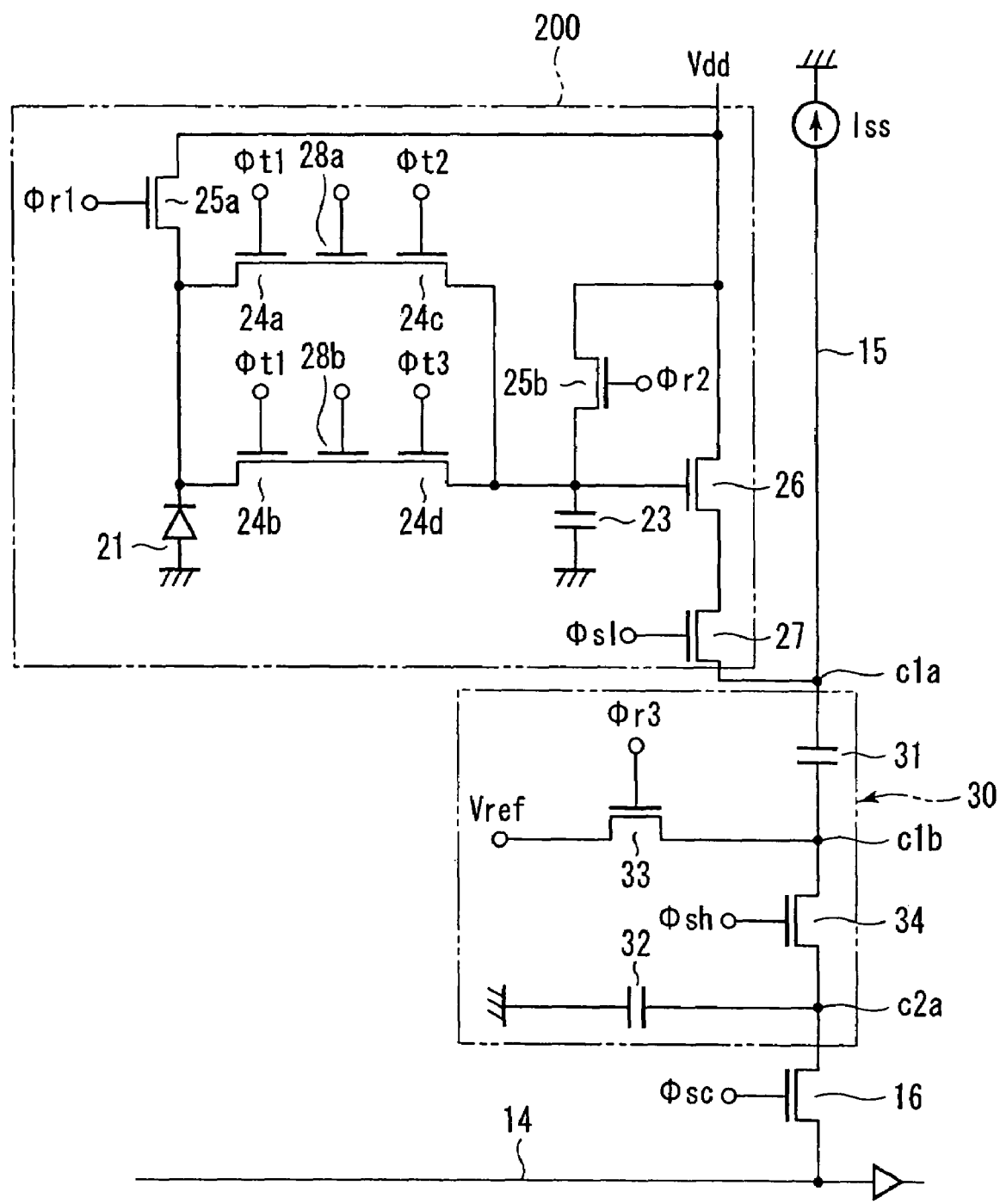
FIG. 7 illustrates the circuit structure of the imaging device, focusing on the circuit structure of one pixel and the CDS/SH circuit as a second embodiment of the present invention.

As shown in FIG. 7, a first MOS gate 28a is mounted between the first and third transfer transistors 24a, 24c in a pixel 200, and a second MOS gate is mounted between the second and fourth transfer transistors 24b, 24d.

By applying a voltage to the first and second MOS gates 28a, 28b, the first and the second MOS gates 28a, 28b function as capacitors. The vertical shift register 12 switches on and off to apply voltage to the first and second MOS gates 28a, 28b.

The voltage is applied to the first and second MOS gates 28a, 28b so that the ratio of electrostatic capacity is 9:1. Consequently, similar to the first embodiment, when Qpd is transferred from PD 21, an electrical charge of Qpd×9/10 is stored in the first MOS gate capacitor 28a, and an electrical charge of Qpd/10 is stored in the second MOS gate capacitor 28b.

The other structures and functions in the second embodiment are the same as those of the first embodiment.

Figure 8:
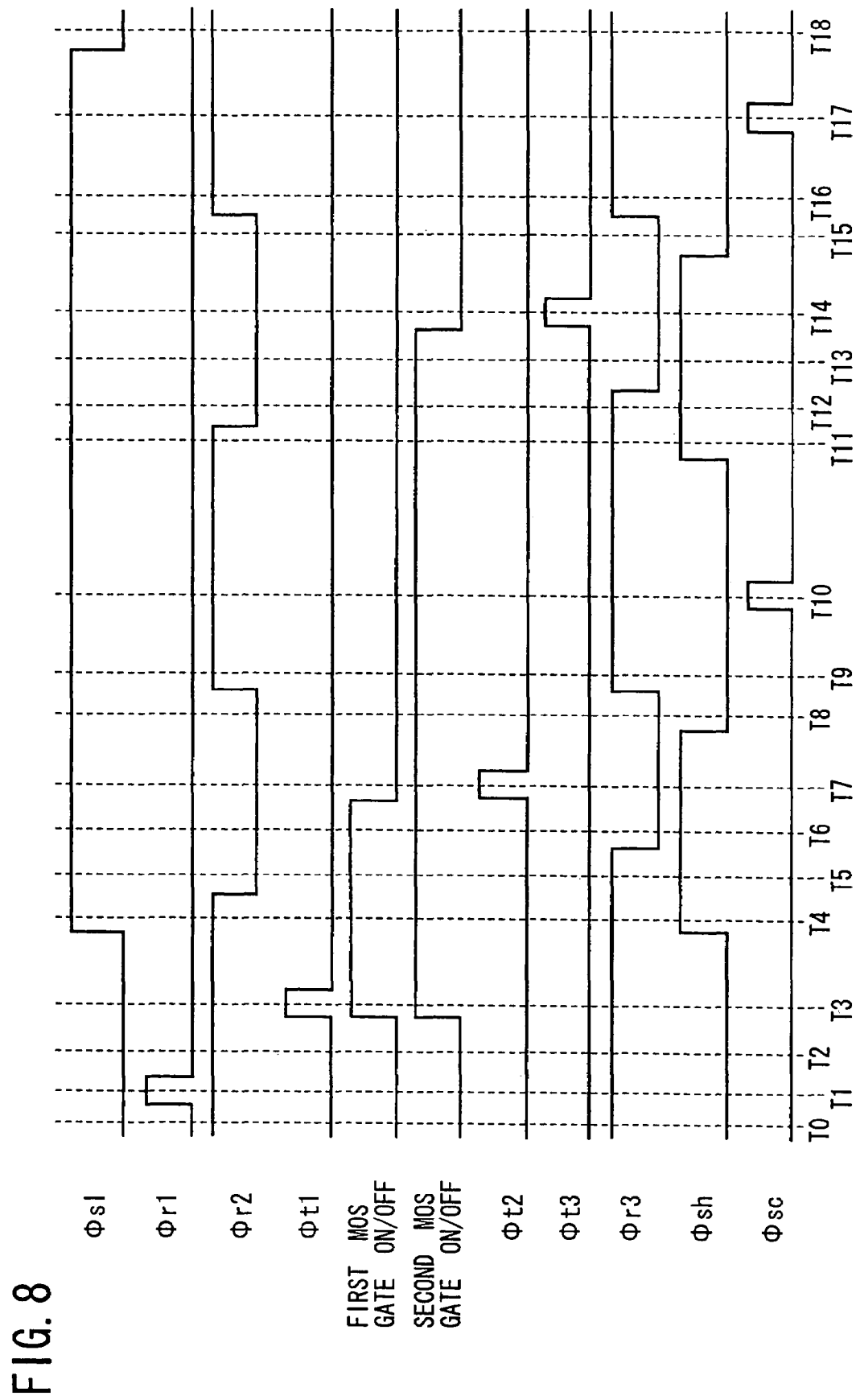
FIG. 8 is a timing chart of the data output process of the imaging device in the second embodiment.

The operation of the CMOS solid state imaging device 100 in the second embodiment is described below with reference to FIG. 8, which is a timing-chart of the data output process in the second embodiment.

At the time T0, when standing by for photographing, φr2 and φr3 are kept in the ON state, and FD 23 and the clamp capacitor 31 are reset.

When a user inputs a command to take a photograph, the photographing operation of the CMOS solid state imaging device 100 commences.

At the time T1, φr1 is switched to the ON state, and a signal charge stored in PD 21 is drained to the Vdd.

At the time T2, φr1 is switched to the OFF state, and PD 21 generates and stores a signal charge.

At the time T3, voltage is applied on the first and second MOS gates 28a, 28b and the first and second MOS gates 28a, 28b can function as capacitors. At the same time, φt1 is switched to the ON state. Then, the signal charges stored in PDs 21 of all pixels 200 are transferred to the first and second MOS gate capacitors 28a, 28b. Additionally, the exposure time is adjustable similar to the first embodiment.

Similar to the first embodiment, after the time T3, the row of pixels 20 to output the pixel signals are selected one by one from the top to the bottom.

At the time T4, +φsl is switched to the ON state, and a pixel signal can be output from the pixel 200. At the same time, φsh is switched to the ON state. Then the sample and hold capacitor 32 is reset.

At the time T5, φr2 is switched to the OFF state, while keeping φr3 in the ON state. Then, the reset of FD 23 finishes.

At the time T6, φr3 is switched to the OFF state, and the output terminal c1b of the clamp capacitor 31 and the first terminal c2a of the sample and hold capacitor 32 are made to float electrically.

At the time T7, φt2 is switched to the ON state, and the signal charge stored in the first MOS gate capacitor 28a is transferred to FD 23. Similar to the first embodiment, the electrical potential of the first terminal c2a of the sample and hold capacitor 32 varies according to the signal charge transferred from the first MOS gate capacitor 28a.

At the time T8, φsh is switched to the OFF state, and the sample and hold capacitor 32 samples and holds the varied quantity of electrical potential.

At the time T9, φr2 and φr3 are switched to the ON state, and FD 23 and the clamp capacitor 31 are reset. After the time T9, φsc for a plurality of the column select transistors 16, is switched to the ON state one by one from left to right (see the time T10). Then, the pixel signal which is sampled and held by the sample and hold capacitor 32 is output from the CMOS solid state imaging device 100 via the horizontal output line 14.

At the time T11, φsh is switched to the ON state, and the sample and hold capacitor 32 is reset.

At the time T12, φr2 is switched to the OFF state, while keeping φr3 in the ON state. Then, the reset of FD 23 finishes.

At the time T13, φr3 is switched to the OFF state, and the output terminal c1b of the clamp capacitor 31 and the first terminal c2a of the sample and hold capacitor 32 are made to float electrically.

At the time T14, φt3 is switched to the ON state, and the signal charge stored in the second MOS gate capacitor 28b is transferred to FD23. Similar to the first embodiment, the electrical potential of the first terminal c2a of the sample and hold capacitor 32 varies according to the signal charge transferred from the second MOS gate capacitor 28b.

At the time T15, φsh is switched to the OFF state, and the sample and hold capacitor 32 samples and holds the varied quantity of the electrical potential at the first terminal c2a.

At the time T16, φr2 and φr3 are switched to the ON state again, and FD 23 and the clamp capacitor 31 are reset. After the time T16, φsc for a plurality of the column select transistors 16 is switched to the ON state, one by one from left to right (see the time T17). Then, the pixel signal which is sampled and held by the sample and hold capacitor 32 is output from the CMOS solid state imaging device 100 via the horizontal output line 14.

At the time T18 after the pixel signal is output from the pixel 200 arranged at the right end, φsl is switched to the OFF state. Then the output of the pixel signals from the pixels 200 arranged in the specified row finishes. After this, pixel signals which are generated by other pixels 200 arranged in other rows, are output similar to the operations held at the times T3~T18.

According to the above second embodiment, a CMOS solid state imaging device 100 can also have a wide dynamic range without the picture quality deteriorating by carrying out the global shutter function.

In the above first embodiment, the ratio of the electrostatic capacities of the first and second capacitors 22a, 22b is determined to be 9:1. In the above second embodiment, the ratio of the electrostatic capacities of the first and second MOS gate capacitors 28a, 28b is also determined to be 9:1. However, this ratio is not restricted to being 9:1. The same effect as that of these embodiments can be achieved as long as the electrostatic capacities are different to each other.

In the above first and second embodiments, the first reset transistor 25a is connected to PD 21. However, an imaging device can have a wide dynamic range without the picture quality deteriorating without the first reset transistor.

In the above first and second embodiments, FD 23 is adapted, however, any other kind of capacitor, of which the electrical potential varies according to a signal charge transferred from the first and second capacitors 22a, 22b or the first and second MOS gate capacitors 28a, 28b, is adaptable, for example a floating gate.

In the above first and second embodiments, the pixels are arranged in a matrix. However, any arrangement in two dimensions is adaptable.

In the above first and second embodiments, the imaging device is a CMOS imaging device. However, the present invention may have any kind of imaging device which comprises an XY address.

In the above first and second embodiments, the transistors in the imaging block 11 are n-channel type. However, in the present invention, p-channel transistors are adaptable if the polarity of the electrical potential is changed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2006-198653 (filed on Jul. 20, 2006), which is expressly incorporated herein, by reference, in its entirety.

The invention claimed is:

1. An imaging device, comprising:
a photoelectric conversion element that generates an electrical charge according to the amount of light received by said photoelectric conversion element;
a first capacitor that receives and stores said electrical charge generated by said photoelectric conversion element;
a second capacitor that receives and stores said electrical charge generated by said photoelectric conversion element, the electrostatic capacity of said second capacitor being lower than that of said first capacitor;
first and second charge transfer elements that transfer said electrical charge generated by said photoelectric conversion element to said first and second capacitors simultaneously, respectively;
a third capacitor that receives said electrical charge stored in said first or second capacitor, the electrical potential of said third capacitor varying according to said received electrical charge;
a third charge transfer element that transfers said electrical charge stored in said first capacitor to said third capacitor;
a fourth charge transfer element that transfers said electrical charge stored in said second capacitor to said third capacitor at a different time from that of said third charge transfer element;
a reset element that resets said electrical charge stored in said third capacitor; and
an amplifier element that outputs a pixel signal according to the electrical potential of said third capacitor.

2. An imaging device according to claim 1, wherein a plurality of pixels having said first, second, and third capacitors, said first, second, third, and fourth charge transfer elements, said reset element, and said amplifier element are arranged in two dimensions on the light receiving surface of said imaging device.

3. An imaging device according to claim 1, wherein said first and second capacitors are MOS capacitors.

* * * * *